United States Patent [19]

Reaux

[11] Patent Number: 5,056,830
[45] Date of Patent: Oct. 15, 1991

[54] FLANGED REPAIR COUPLING FOR PIPELINE SERVICE

[76] Inventor: James R. Reaux, 1019 Lafayette St., Lafayette, La. 70501

[21] Appl. No.: 558,948

[22] Filed: Jul. 27, 1990

[51] Int. Cl.[5] .............................. F16L 55/18
[52] U.S. Cl. .................................. 285/15; 285/147; 285/323; 285/363
[58] Field of Search ................. 285/3, 15, 322, 323, 285/343, 146, 147

[56] References Cited

U.S. PATENT DOCUMENTS

| | | | |
|---|---|---|---|
| 2,624,413 | 1/1953 | Mueller et al. ................ | 285/146 |
| 3,822,075 | 4/1989 | Reaux ............................ | 285/3 |
| 4,290,632 | 9/1981 | Manchester et al. ........... | 265/15 X |
| 4,330,143 | 5/1982 | Reneau ......................... | 285/322 X |

*Primary Examiner*—Dave W. Arola
*Attorney, Agent, or Firm*—Fulbright & Jaworski

[57] ABSTRACT

A flanged coupling for the repair of pipe lines which is engagable over an open pipe. A piston is actuated by drawing two flanges together and setting a slip and a packing to anchor and seal the coupling unit to the pipe. Tension and compression in the pipe does not affect the packing as a ring is positioned between the slip and the packing and its movement towards the packing is limited.

3 Claims, 3 Drawing Sheets

FLANGED REPAIR COUPLING FOR PIPELINE SERVICE

BACKGROUND OF THE INVENTION

This invention relates to the maintenance and repair of pipe lines and in particular is directed to pipe lines which require change, repair or replacement of sections of the pipe. My U.S. Pat. No. 4,822,075 discloses a mechanical pipe connector which connects the open ends of pipe sections by means of a pair of pipe flanges which automatically set slips and packing. The drawing of two flanges together by the flange studs and nuts actuates a piston which in turn sets a slip and seal for sealingly connecting two pipe sections.

However, the pipe lines may be subjected to various longitudinal compressive and tension forces, such as temperature changes or ground movement. These forces, if allowed to work on the packing, may cause the packing to leak. In particular, alternating tension and compressive forces in the packing will cause packing failure.

The present invention provides a flange repair coupling in which the tension or compression in the pipe is not applied to the packing element and, therefore, does not adversely affect its sealing capability. The slips and the packing element are separated by a ring which transfers loads through the slips and flange housing instead of to the packing element.

SUMMARY

The present invention is directed to an improvement in a repair coupling for connecting a first open ended pipe section to a first flange including a coupling flange sealingly engagable with the first flange. The coupling flange includes a cylindrical body having an inner diameter bore greater in diameter than the outside diameter of the first open ended pipe section to be received therein with an annulus therebetween. The body includes radially inwardly directed walls at each end of the annulus, piston means slidably axially within the annulus with a head portion extending from the coupling flange to be depressed by the first flange. Slip means and packing means are positioned in the annulus for anchoring and sealing against the pipe section by axial movement of the piston means with means to draw the two flanges together. The improvement is directed to means for isolating the packing means from tension and compression in the pipe and includes a ring positioned in the annulus between the slip means and the packing means, and means engagable with the ring limiting the movement of the ring towards the packing means.

A still further object of the present invention is wherein the body includes a cylindrical recess adjacent the bore for receiving the ring, and the means limiting movement of the ring includes coacting shoulders on the ring and the body.

A still further object is wherein the ring is discontinuous such as being a segmented ring and a second continuous ring is positioned between the discontinuous ring and the packing means. The second continuous ring has an outer diameter that is less than the outer diameter of the discontinuous ring.

Other and further objects, features and advantages will be apparent from the following description of a presently preferred embodiment of the invention, given for the purpose of disclosure and taken in conjunction with the accompanying drawings.

BRIEF DESCRIPTION OF THE PREFERRED EMBODIMENT

Figure 1:
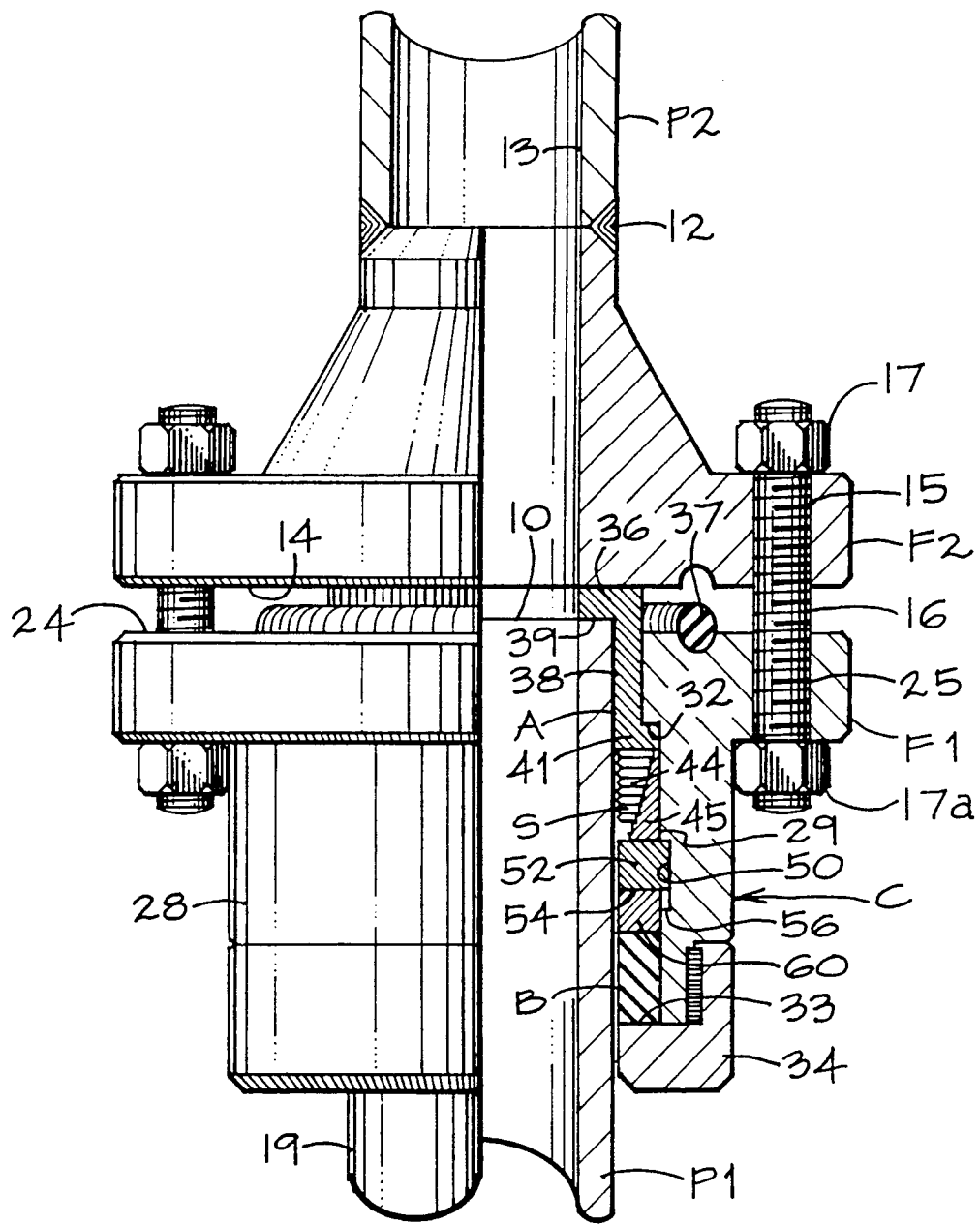
FIG. 1 is an exploded, elevational view, in cross section, of the parts of the present invention in position ready to be set.
Figure 2:
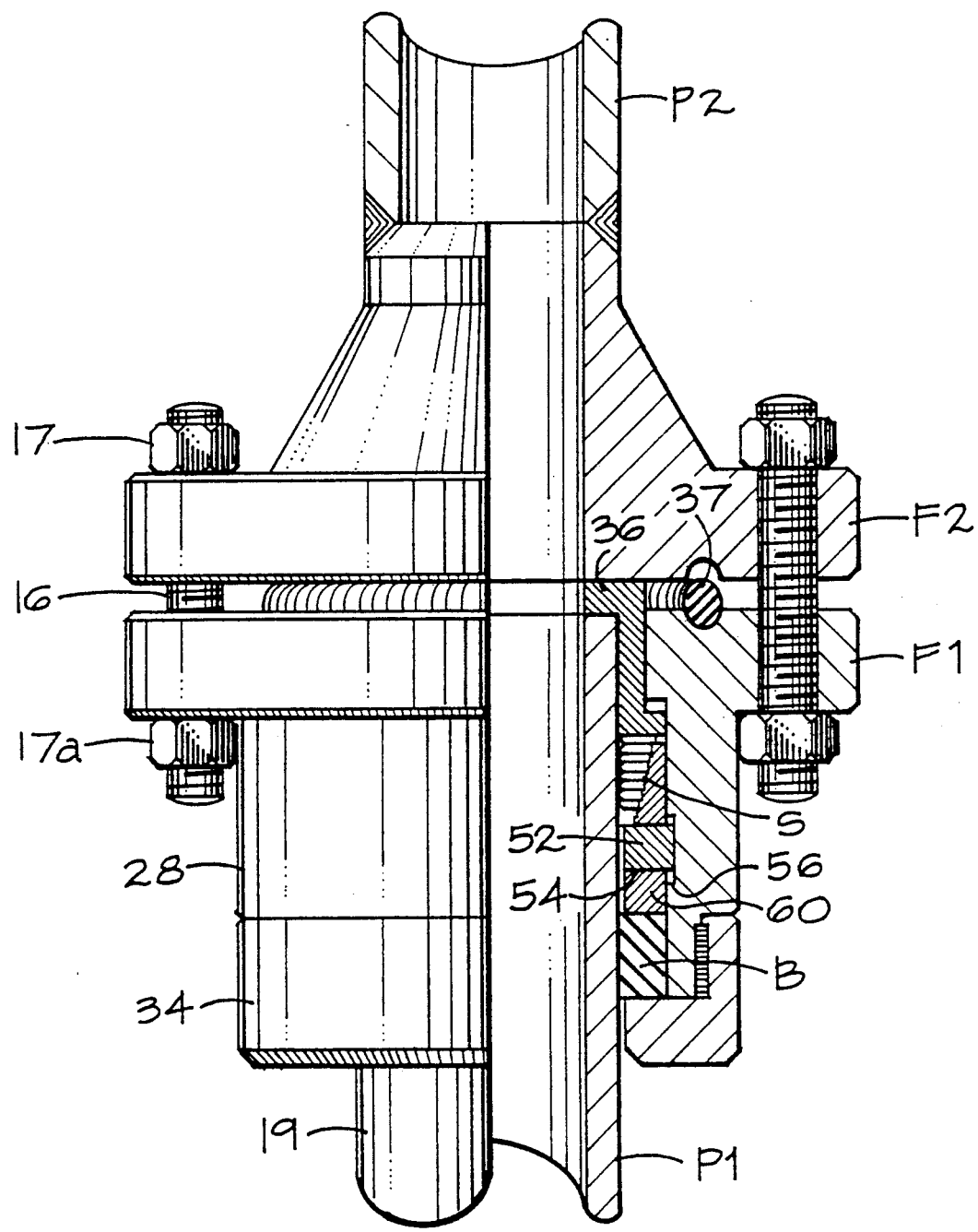
FIG. 2 is an elevational view, in cross section, of the present invention installed on a section of pipe and in a partially set position.
Figure 3:
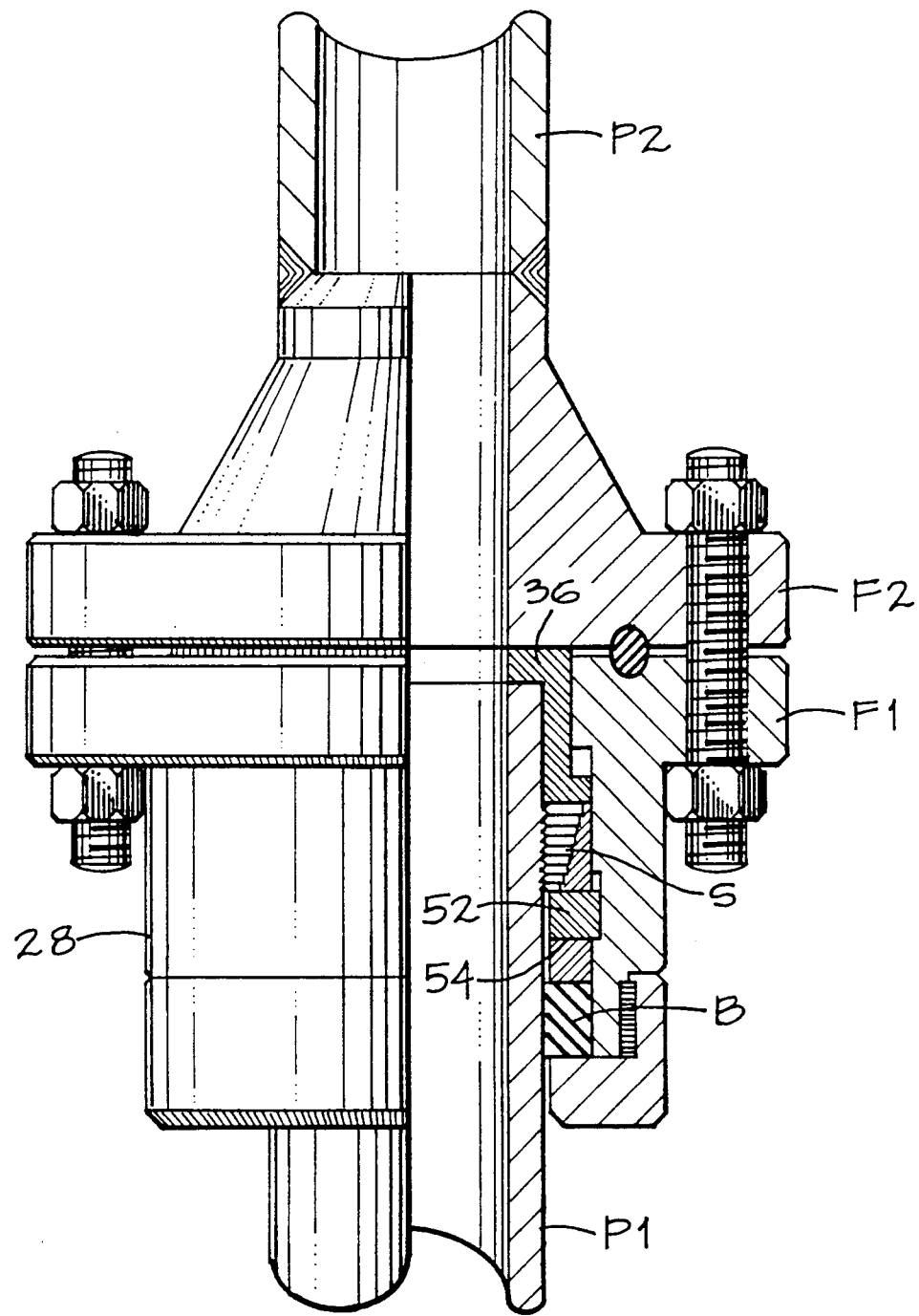
FIG. 3 is an elevational view, in cross section, illustrating the present invention set in place connecting and providing a seal in a section of a pipe.

Referring now to the drawings, the flanged repair coupling C is a unit that is slidable over the open end of one pipe section P1 and engagable with the open end of another pipe section P2. The pipe section P1 is a new or old section of pipe that has been cut off to have an open end 10 substantially normal to its axis and the exterior 19 is cleaned for entering the coupling C as shown in FIGS. 1, 2 and 3. The pipe section P2 is fitted with a flange F2 which may be a standard pipe flange welded at 12 to the pipe section P2 having a bore 13. Flange F2 has a sealing face 14 and a circumferential bolt holes 15 surround the face 14 to receive studs 16.

The flange F1 includes a sealing face 24, and a circumferential bolt pattern of holes 25 for receiving the studs 16 to draw the flanges together when nuts 17 and 17a are tightened. The flange F1 includes a cylindrical body 28 that extends over the open end portion of pipe section P1 leaving a concentric annulus between its inner diameter 29 and the exterior diameter 19 of the pipe section P1. Body 28 includes radially inwardly directed walls 32 and 33 at opposite ends. The flange F1 and body 28 accommodate an actuator or piston means A, a packing means B, and an anchor or slip means S. The wall 33 is preferably provided a screw-on cap 34 threaded onto the exterior of the body 28 and having a bore slidably engagable over the diameter 19 of the pipe section P1.

The piston means A is mechanically operated by engagement with the face 14 of flange F2 in order to axially compress the packing means B and set the slips S. Piston means A has a head 36 that projects inwardly from face 29 there being a surrounding standard joint ring seal 37 to engage both faces 14 and 24 in the usual manner. The piston means A includes a cylindrical portion 38 which carries a head portion 36 having a shoulder 39 to engage the open end 10 of pipe P1. The cylinder portion 38 also carries ram portion 41 that slidably occupies the annulus between the body 28 and the pipe P1.

The packing means B may be any suitable compressible material such as a buna N elastomer or viton or a metal seal. The packing means B is a right cylinder.

The anchor or slip means S is shown as an inwardly tapered split ring 44, or separate slip wedges, operable outwardly and downwardly on a complementary conical surface 45 so as to be forced radially inwardly upon downward movement of the split ring 44 which bites into the exterior surface 19 of the pipe P1. The above description of a flange repair coupling is generally disclosed in U.S. Pat. No. 4,822,075.

The present improvement provides a flange repair coupling with a structure so that neither tension nor compression on the pipe adversely affects the packing means B. That is, the pipe sections P1 and P2 may longitudinally move, such as due to temperature or mechanical changes, thereby applying tension or compressive forces on the connection. And, in fact, alternating tension and compression on the pipe line if applied to the packing means B, will tend to cause leakage between the packing means B and the pipe section P1 In the present invention the packing means or element B is separated from the slip or anchoring means S to isolate the packing means B from tension and compression in the pipe.

The body 28 includes a cylindrical recess 50 adjacent the bore 29 for receiving a ring 52 which is positioned in the annulus between the slip means S and the packing means B. Preferably, for ease of manufacturing, the ring 52 is a discontinuous ring for insertion into the recess 50 through the bore 29. Thus, the ring 50 may be a split ring or preferably a segmented ring. Means are provided engagable with the ring 52 for limiting the movement of the ring towards the packing means B. Thus, coacting shoulders 54 and 56 are provided between the ring 52 and body 28 thereby insuring that any load from tension in the pipe P1 is transferred through the slips S and segmented ring 52 to the body 28 and not to the elastomer seal B.

However, if the ring 52 is a discontinuous ring, a second continuous ring 60 is provided between the ring 52 and the packing element B in order to insure that the discontinuous surface of the ring 52 will not contact and damage the packing element B. Preferably, the outside diameter of the second ring 60 is less than the outside diameter of the first ring 52. That is, the outside diameter of the second ring 60 is aligned with the bore 29 of the housing 28 and the outside diameter of the packing means B.

In operation, the parts are assembled, as best seen in FIG. 1, preferably with the lower nuts 17a trapped by the flange housing 28 to simplify installation. Torque is applied to the upper nuts 17 thereby automatically drawing the flange F1 towards F2 as best seen in FIG. 2. This actuates the piston means 26 applying axial pressure to the slip means S and the packing means B. The packing means B is set into a seating relationship with the outside 19 of the pipe P1, but cannot be overstressed as the application of pressure is limited by the engagement of the shoulders 54 and 56 on the ring 52 and body 28, respectively. Generally, the packing means B is set and sealed prior to the anchoring of the slip means C into the exterior 19 of the pipe P1 as the flanges F1 and F2 are brought together by the studs 16. The connection cannot be overtorqued and when the flanges F1 and F2 mate, any additional torque is transmitted through the flanges. The set position is best seen in FIG. 3.

The load from tension in the pipes P1 and P2 is applied to the slip means S and through the ring 52 to the housing 28 and thus is not applied to the packing means B. Load from compression in the pipes P1 and P2 is applied to the flanges F1 and F2 and not to the packing means B.

The present invention, therefore, is well adapted to carry out the objects and attain the ends and advantages mentioned as well as others inherent therein. While a presently preferred embodiment of the invention has been given for the purpose of disclosure, numerous changes in the details of construction will be readily apparent to those skilled in the art and which are encompassed within the spirit of the invention and the scope of the appended claims.

What is claimed is:

1. In a repair coupling for connecting a first open ended pipe section to a first flange including a coupling flange sealing engagable with the first flange, said coupling flange including a cylindrical body having an inner diameter bore greater in diameter than the outside diameter of the first open ended pipe section to be received therein with an annulus therebetween and having a radially inwardly directed wall at each end of the annulus, piston means slidable axially within the annulus and with a head portion extending from the coupling flange to be depressed by the first flange, slip means and packing means within the annulus for anchoring and sealing against the pipe section by axial movement of the piston means, and means to draw the two flanges together, the improvement in means for isolating the packing means from tension and compression in the pipe comprising:

a ring positioned in the annulus between the slip means and the packing means, means engagable with the ring limiting the movement of the ring towards the packing means, said ring is discontinuous, and a second continuous ring is positioned between the discontinuous ring and the packing means.

2. In a repair coupling for connecting a first open ended pipe section to a first flange including a coupling flange sealing engagable with the first flange, said coupling flange including a cylindrical body having an inner diameter bore greater in diameter than the outside diameter of the first open ended pipe section to be received therein with an annulus therebetween and having a radially inwardly directed wall at each end of the annulus, piston means slidable axially within the annulus and with a head portion extending from the coupling flange to be depressed by the first flange, slip means and packing means within the annulus for anchoring and sealing against the pipe section by axial movement of the piston means, and means to draw the two flanges together, the improvement in means for isolating the packing means from tension and compression in the pipe comprising:

a ring positioned in the annulus between the slip means and the packing means, means engagable with the ring limiting the movement of the ring towards the packing means, said ring is a discontinuous ring, said body includes a cylindrical recess adjacent the bore for receiving the discontinuous ring, the means limiting movement of the ring includes coacting shoulders between the ring and the body, and a second continuous ring is positioned between the discontinuous ring and the packing means.

3. The apparatus of claim 2 wherein the outside diameter of the second ring is less than the outside diameter of the first ring.

* * * * *